United States Patent [19]

Angelopoulos et al.

[11] Patent Number: 5,619,357
[45] Date of Patent: Apr. 8, 1997

[54] FLAT PANEL DISPLAY CONTAINING BLACK MATRIX POLYMER

[75] Inventors: Marie Angelopoulos, Cortlandt Manor; Ali Afzali-Ardakani, Yorktown Heights; Claudius Feger; Chandrasekhar Narayan, both of Hopewell Junction, all of N.Y.

[73] Assignee: International Business Machines Corporation, Armonk, N.Y.

[21] Appl. No.: 466,317

[22] Filed: Jun. 6, 1995

[51] Int. Cl.[6] .............................................. G02F 1/1335
[52] U.S. Cl. .............................................. 349/110
[58] Field of Search ..................... 359/59, 67, 68, 359/69

[56] References Cited

U.S. PATENT DOCUMENTS

| | | | |
|---|---|---|---|
| 4,812,387 | 3/1989 | Suzuki et al. | 430/311 |
| 4,837,097 | 6/1989 | Narang et al. | 430/5 |
| 5,028,481 | 7/1991 | Stramel | 428/323 |
| 5,121,237 | 6/1992 | Ikeda et al. | 359/67 |
| 5,155,777 | 10/1992 | Angelopoulos et al. | 385/14 |
| 5,202,061 | 4/1993 | Angelopoulos et al. | 252/500 |
| 5,368,991 | 11/1994 | Uchikawa et al. | 430/288 |
| 5,397,863 | 3/1995 | Afzali-Ardakani et al. | 174/258 |

OTHER PUBLICATIONS

33946 Polyaniline as a High Temperature Dye for Use as an Anti–Reflectivity Coat. Published in Research Disclosure, Jul. 1992, No. 339, Kenneth Mason Publications Ltd, England.

*Primary Examiner*—William L. Sikes
*Assistant Examiner*—James A. Dudek
*Attorney, Agent, or Firm*—Pollock, Vande Sande & Priddy

[57] ABSTRACT

A thin film transistor display that comprises a black matrix polymer layer, comprising a polymer having an optical density of at least about 0.8 per μm and being self-absorbent of visible light and being selected from the group consisting of substituted and unsubstituted polyanilines, substituted and unsubstituted polyparaphenylenevinylenes, substituted and unsubstituted polythiophenes, substituted and unsubstituted polyazines, substituted and unsubstituted polyparaphenylenes, substituted and unsubstituted polyfuranes, substituted and unsubstituted polypyrroles, substituted and unsubstituted polyselenophene, substituted and unsubstituted poly-p-phenylene sulfides and substituted and unsubstituted polyacetylenes, and mixtures thereof, and copolymers thereof. The layer also comprises one or more pigments. The resistivity of the black matrix composite is 10E12 to 10E14 ohm cm.

10 Claims, 6 Drawing Sheets

FLAT PANEL DISPLAY CONTAINING BLACK MATRIX POLYMER

DESCRIPTION

1. Technical Field

The present invention is concerned with active matrix flat panel displays and particularly thin film transistor liquid crystal displays (TFT LCDs). In particular, the present invention is directed to the use of certain polymer compositions as the black matrix polymer layer of the TFT display. The polymer compositions employed in the present invention make it possible to lower the film thickness of the black matrix polymer layer without compromising the optical density.

The particular polymers employed, pursuant to the present invention, have an optical density of at least about 0.8 per μm, are non-conducting, self-absorbent of visible light and are the polyanilines, polyparaphenylenevinylenes, polythiophenes, polyfuranes, polypyrroles, polyselenophene, polyparaphenylenes, polyazines, poly-p-phenylene sulfides and polyacetylenes and mixtures thereof and copolymers made from the monomers to form the above polymers. Any of the above polymers can be substituted or unsubstituted.

The compositions also contain one or more pigments. The resistivity of the black matrix layer is 10E12 to 10E14 ohm cm.

2. Background of Invention

Liquid crystal display devices, electroluminescent display devices, plasma display devices and the like, produce a display pattern on a screen by selectively driving pixel electrodes arranged in a matrix pattern. In such display devices, voltage is applied between each selected pixel electrode and a counter electrode disposed facing it, to optically modulate the display medium, such as liquid crystal or the like, interposed between these electrodes.

This optical modulation is recognized as a display pattern. As a method for driving pixel electrodes, an active matrix driving method is known in which independent pixel electrodes are arranged and are driven via switching elements connected to the respective pixel electrodes. Thin film transistor (TFT) elements, among others, are used as the switching elements to selectively drive the pixel electrodes.

Such devices are capable of providing high contrast display, and therefore, have been used in liquid crystal pocket televisions, word processors, and computer terminal and work station displays.

However, some problems exist for large, high-resolution, full-color thin-film-transistor LCDs. For instance, more recently, larger 10.4-inch TFT liquid crystal displays (LCDs) for VGA application have evolved from development to manufacturing. Efforts have focused on achieving more brightness with lower power consumption. For instance, a black matrix of data/gate metals and pigment-dispersed photopolymer has been fabricated onto the TFT-Array in order to improve aperture ratio.

The black matrix in the TFT-array is to decrease the design margin of cell alignment and to block the passage of light to the amorphous silicon device. Because silicon is a photosensor, photons that reach the silicon can switch the pixel on or off independent of the desired pixel state.

Presently, the black matrix polymer composition of choice contains an acrylic matrix polymer, monomer, photoinitiator and a mixture of pigments to achieve high optical density. With current technology, it is possible to achieve an optical density of 2.2 at a film thickness of 2 μm.

A discussion of prior TFT LCDs can be found in H. Yamanaka, et al., 41.3: Integrated Black Matric on TFT Arrays, SID 92 Digest, 789–792; and T. Koseki, et al., Color Filter for 10.4-in.-diagonal 4096-color thin-film-transistor liquid crystal displays, IBM J. Res. Develop., Vol. 36, No. 1, January 1992, pages 43–50. Also, see U.S. patent application Ser. No. 08/194,239 to John et al., entitled "Liquid Crystal Display with Multi Domains," disclosure of which is incorporated herein by reference.

Nevertheless, the black matrix polymeric film could stand improvement, especially with respect to its thickness and/or optical density.

SUMMARY OF INVENTION

According to the present invention, polymer compositions are employed as the black matrix polymer layer of the TFT display that make it possible to reduce the film thickness of the black matrix layer and achieve the necessary optical density. In particular, the compositions contain a polymer that exhibits an optical density of at least about 0.8 per μm, is non-electrically conducting, and self-absorbent of visible light. The polymer is selected from the group consisting of polyparaphenylenevinylenes, polyanilines, polyazines, polythiophenes, poly-p-phenylene sulfides, polyfuranes, polypyrroles, polyselenophene, polyparaphenylenes, polyacetylenes and mixtures thereof, and copolymers thereof. These polymers can be substituted or unsubstituted. These polymers in the non-doped form are generally insulators exhibiting electrical conductivity lower than 10E-10 ohm(−1) cm(−1). Upon doping, the conductivity of these polymers can be turned from 10E-10 ohm(−1) cm(−1) to 10E5 ohm(−1) (cm(−1). In this invention, the polymers are used in their non-doped or non-conducting form.

In addition, the composition contains at least one pigment. The relative amounts of the polymer are typically about 30% to about 80%, based upon the total weight of the polymer and pigment in the composition, and the relative amounts of the pigments are typically about 20% to about 70%, based upon the total weight of the polymer and pigment in the composition. The preferred composition is 30–40% pigment and 70–60% polymer.

A typical array employing the black matrix polymer layer of the present invention comprises a substrate, a diffuser layer located above the substrate, a polarizer layer located adjacent to the diffuser layer; a capacitor layer located adjacent to the polarizer layer; thin film transistor layers located adjacent to the capacitor layer and containing data or column electrode and row electrode; a black polymer layer as defined above located adjacent to the thin film transistor layer; and an alignment layer adjacent to the black matrix polymer layer.

BEST AND VARIOUS MODES FOR CARRYING OUT INVENTION

Figure 1A:
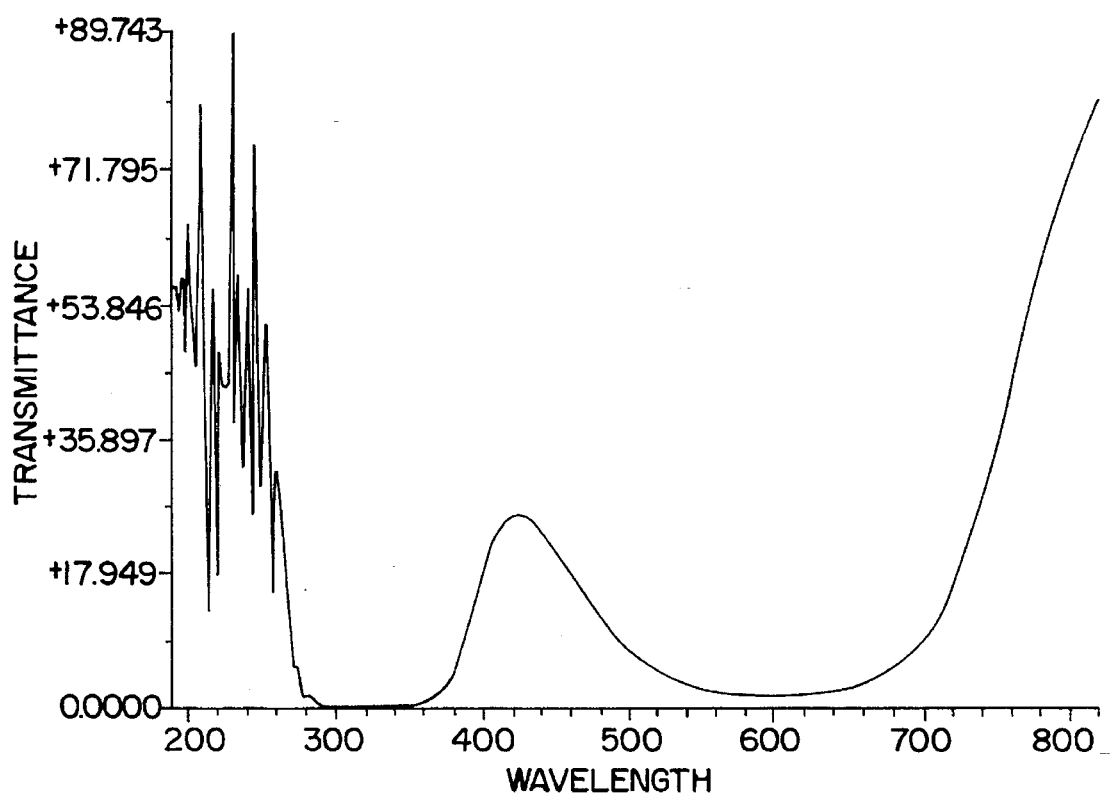
FIGS. 1a and 1b are the transmission spectra of a 1 μm film of a polymer employed pursuant to the present invention.

The compositions employed as the black matrix layer pursuant to the present invention contain a polymer that exhibits an optical density, of at least about 0.8, is non-conducting and self-absorbent of visible light.

The polymer is selected from substituted and unsubstituted polyparaphenylenevinylenes, substituted and unsubstituted polyazines, substituted and unsubstituted polyanilines, substituted and unsubstituted polythiophenes, substituted and unsubstituted polyfuranes, substituted and unsubstituted polyparaphenylenes, substituted and unsubstituted poly-p-phenylene sulfides, substituted and unsubstituted polypyrroles, substituted and unsubstituted polyselenophene, substituted and unsubstituted polyacetylenes, and combinations thereof and copolymers made from the monomers to form the above polymers. Examples of suitable substitutions include alkyl, aryl, alkoxy, aryloxy groups, alkanyl and aralkyl. Typically, such groups contain 1–12 carbon atoms. The substituted polymers are preferred because they exhibit enhanced solubility and processability.

One type of polymer useful to practice the present invention is a substituted or unsubstituted polyaniline having the following general formula:

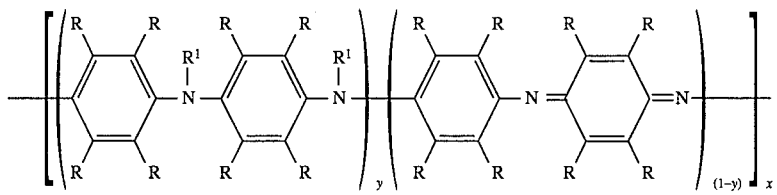

wherein each R can be H or any organic or inorganic radical; each R can be of the same or different; wherein each $R^1$ can be H or any organic or inorganic radical, each $R^1$ can be the same or different; X is $\geq 1$ and preferably $X \geq 2$ and y has a value from 0 to 1, and preferably 0.5. Examples of organic radicals are alkyl or aryl radicals. Examples of inorganic radicals are Si and Ge. This list is exemplary only and not limiting. In the above equation, the polyaniline has a conductivity of about $10^{-10}$ ohm$^{-1}$cm$^{-1}$.

Preferred substituted polyaniline compounds employed in the present invention are ethoxy derivatives represented by the following:

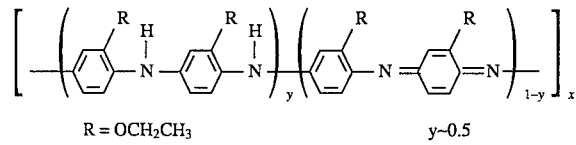

R = OCH$_2$CH$_3$      y~0.5

The ethoxy substituted polyaniline in the non-doped form (base) can be readily dissolved to 10% by weight in solvents such as N-methylpyrrolidinone, γ-butyrolactone, dimethylformamide, dimethylsulfoxide, dimethylpropylene urea, chloroform, ethanol, etc. These solutions can be spun at various rpms to form films of different thicknesses. Films from this polymer are very homogenous and well adherent.

Other prefered substituted polyanilines include propyl derivatives, propoxy derivatives, butoxy derivatives, butyl derivatives, and hexyl derivatives.

Examples of suitable polythiophenes are represented by the following formula:

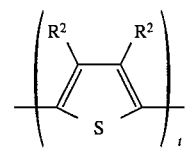

wherein each $R^2$ is H or any organic or inorganic radical; wherein $t \geq 1$ and preferably wherein at least one $R^2$ is not H.

Polyparaphenylenevinylenes useful to practice the present invention have general formula wherein each $R^3$ is H or any organic or inorganic radical, and wherein $s \geq 1$. Each $R^3$ can be the same or different:

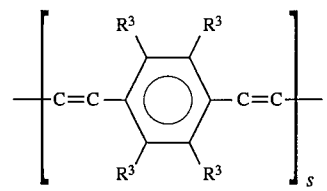

Polyazines useful to practice the present invention have general formula wherein $R^{10}$ is H or an organic or inorganic radical:

$+CR^{10}=N-N=CR^{10}\}_n$    wherein n ≥ 1

Polyfurans useful to practice the present invention have general formula, wherein $Z \geq 1$ and each $R^4$ is H or any organic radical, and each $R^4$ can be the same or different:

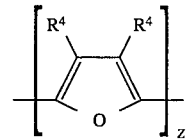

Polypyrroles which are useful to practice the present invention have general formula, wherein $w \geq 1$, each $R^5$ is H or any organic or inorganic radicals; wherein each one $R^5$ can be the same or different:

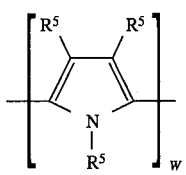

Polyselenophene useful to practice the present invention have general formula, wherein $v \geq 1$, and each $R^6$ is H or any organic or inorganic radical and wherein each $R^6$ can be the same or different:

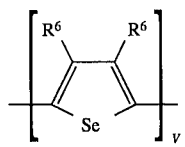

Examples of combinations of polythiophenes, polyfurans, polypyrroles and polyselenophene useful to practice the present invention are represented by the following equations wherein $R^4$, $R^5$ and $R^6$ are as defined above wherein at least two of a, b, c and d are greater than or equal to 1; $m \geq 1$; $Q^1$, $Q^2 Q^3$ can be a vinylene group or a direct bond between adjacent constituents:

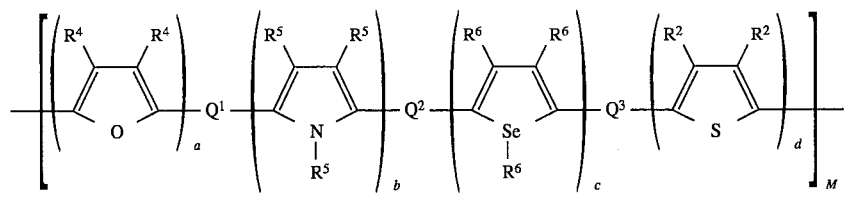

Poly-p-phenylene sulfides useful to practice the present invention are represented by the following general formula wherein each $R^7$ is H or any organic or inorganic radical and $f \geq 1$, each $R^7$ can be the same or different:

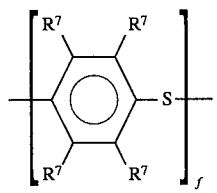

The article entitled *New Routes to Processed Polyacetylenes,* T. Swager, et al. Polymer Preprints, Vol. 30, No. 1, p. 161, April 1989, describes methods of preparing polyacetylene from a soluble precursor, the teaching of which is incorporated herein by reference.

Any blends of the above polymers, in particular, blends in which one of the polymers is polyaniline can be used.

The pigments employed in the black polymer matrix according to the present invention include yellow pigments, violet pigments, and blue pigments, in particular yellows based on isoindoline compounds, violet pigments based on dioxazine compounds, and blue pigments based on Cu-phthalocyanine compounds. The preferred pigment mixture consists of equal parts of the three pigments or of equal parts of the yellow and the violet pigments.

Figure 6:
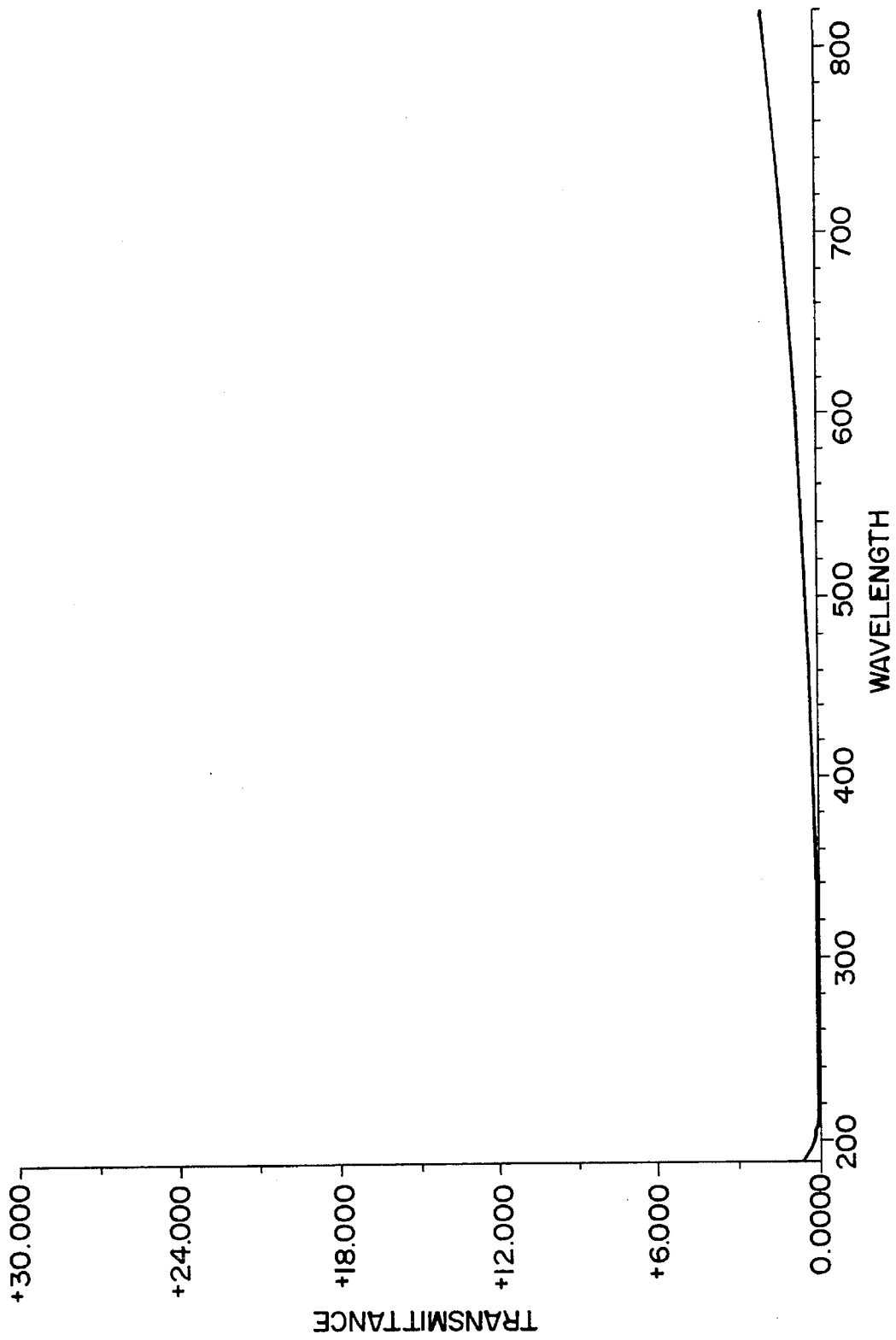
FIG. 6 is a transmission spectra for a thin PMMA film containing fluorinated carbon black employed pursuant to the present invention.
Figure 7:
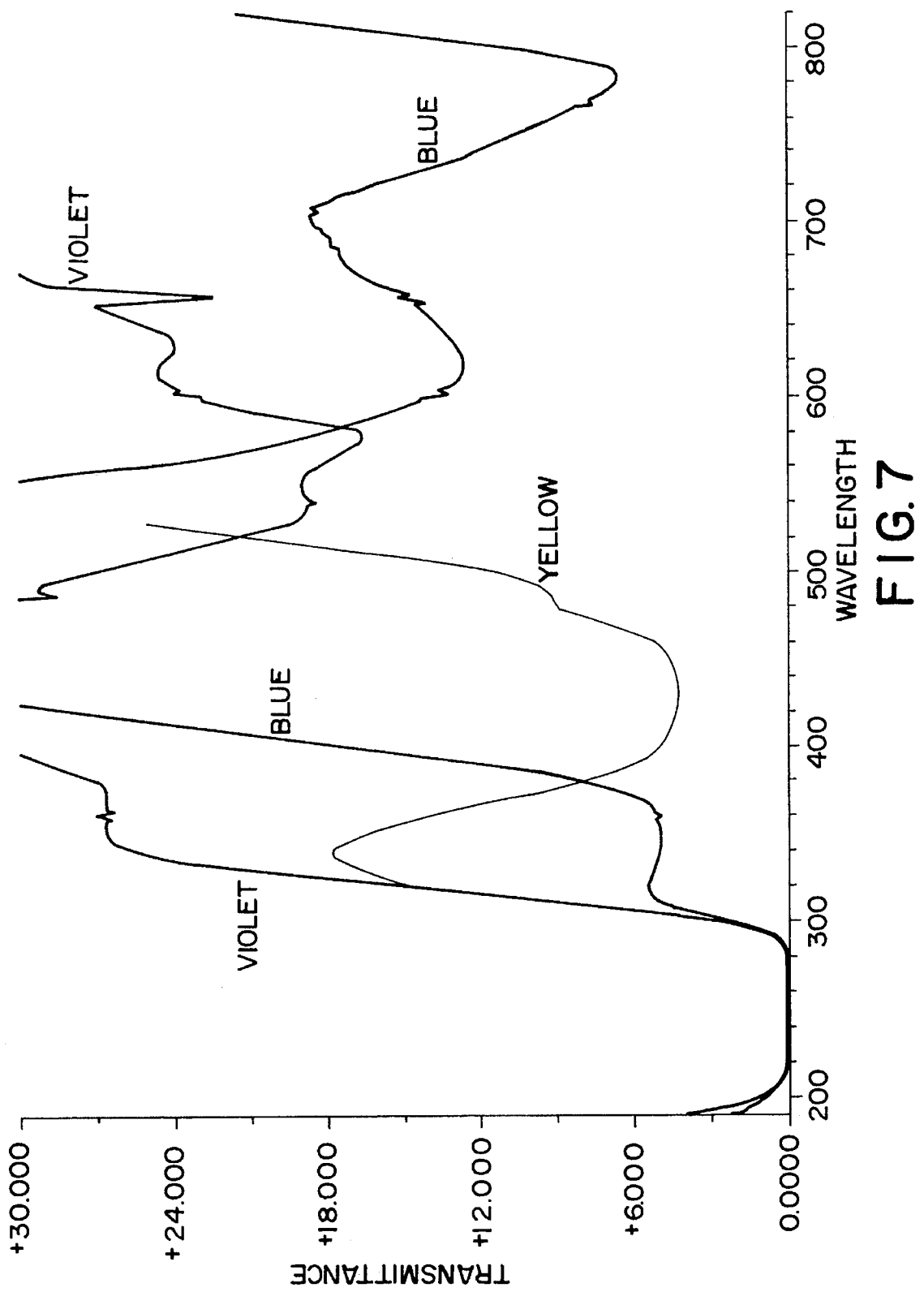
FIG. 7 is a transmission spectra for a PMMA film containing various pigments

Another possible pigment is fluorinated carbon black. This commercially available product which has a fluoro content of 10–60% is a dielectric material that also absorbs light as shown in FIG. 6. These materials have been described in the prior art, such as in U.S. Pat. No. 5,397,863, entitled "Fluorinated Carbon Polymer Composite," disclosure of which is incorporated herein by reference.

The amount of polymer in the composition is typically about 30% to about 80%, and preferably about 60% to about 70%, and complementary the amount of pigment is about 20% to about 70%, and preferably about 30% to about 40%. The above amounts are based upon the total amount of polymer and pigment in the composition.

The composition is made by dispersing the pigment or pigment mixture in the polymer solution. The composition is typically applied by spin casting from a solution. Typical solvents include N-methylpyrollidinone, γ-butyrolactone, dimethylformamide, dimethylsulfoxide, dimethylpropylene urea, chloroform, and ethanol, depending upon the solubility characteristics of the polymer and pigment.

The black matrix material can be patterned by several methods. Conventional photoresist technology can be employed as is well known in the art in which a photoresist is applied to the top of the black matrix layer and patterned. After the photoresist is patterned, the pattern is transferred to the black matrix by etching techniques, such as oxygen reactive ion etching, followed by removal of the photoresist.

The black matrix can be made radiation sensitive itself. Photosensitive materials can be added to the black matrix formulation, such as acrylated monomers, as taught in the prior art.

Radiation sensitive groups, such as crosslinkable groups, can be incorporated into the black matrix polymer backbone, such as the polyaniline. These groups can subsequently be crosslinked by radiation with the use of radical initiators. Such chemistries are described in U.S. Pat. No. 5,370,825, of which is incorporated herein by reference. In addition, photo acid generators can be added to the black matrix composition. The photoacid generators will dope the polymers of the present invention upon irradiation, and the exposed region will no longer be soluble.

Examples of such photoinitiators are well-known and include onium salts and especially Group VIA and Group VIIA salts, such as the pyrylium, selenonium, sulfonium, and iodonium salts. Various suitable photoinitiators are discussed in U.S. Pat. Nos. 4,161,478; 4,442,197; 4,139,655; 4,400,541; 4,197,174; 4,173,476; and 4,299,938; and European Patent Applications 44/0094914 and 84/0126712, disclosures of which are incorporated herein by reference.

Also, see Watt, et al., *A Novel Photoinitiator of Cationic Polymerization: Preparation and Characterization of Bis[4-(diphenylsulfonio)phenyl]-sulfide-Bis-Hexafluorophosphate,* Journal of Polymer Science: Polymer Chemistry Edition, Vol. 22, p. 1979 (1980) John Wiley & Sons, Inc.

Additional discussions concerning sulfonium and iodonium salts can be found, for instance, in Crivello, et al., *Complex Triarylsulfonium Salt Photoinitiators. II. The*

Preparation of Several New Complex Triarylsulfonium Salts and Influence of Their Structure in Photoinitiated Cationic Polymerization, Journal of Polymer Science: Polymer Chemistry Edition, Vol. 18, pp. 2697–2714 (1980) John Wiley & Sons, Inc.; Pappas, et al., *Photoinitiation of Cationic Polymerization. III. Photosensitization of Diphenyliodonium and Triphenylsulfonium Salts*, Journal of Polymer Science: Polymer Chemistry Edition, Vol. 22, pp. 77–84 (1984) John Wiley & Sons, Inc.; Crivello, et al., *Photoinitiated Cationic Polymerization with Triarylsulfonium Salts*, Journal of Polymer Sciences: Polymer Chemistry Edition, Vol. 17, pp. 977–999 (1979) John Wiley & Sons, Inc.; Crivello, et al., "*Complex Triarylsulfonium Salt Photoinitiators. I. The Identification, Characterization, and Syntheses of a New Class of Triarylsulfonium Salt Photoinitiators,* Journal of Polymer Science: Polymer Chemistry Edition, Vol. 18, pp. 2677–2695 (1980) John Wiley & Sons, Inc.; and Crivello, *Cationic Polymerization—Iodonium and Sulfonium Salt Photoinitiators*, Advances in Polymer Science, Series #62, pp. 1–48 (1984) Springer-Verlag.

Examples of some sulfonium salts are arylacyldialkyl and hydroxyaryldialkyl sulfonium salts represented by the following formulae:

$$[RCC(R^1)_2S(R^2)_2]^+MQ_d^- \quad (1)$$

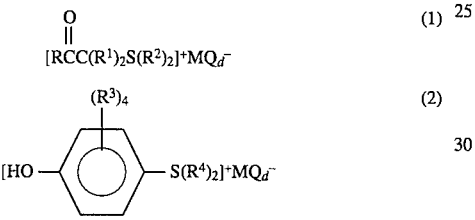
(2)

where R is a $C_{(6-13)}$ monovalent aromatic organic radical or substituted $C_{(6-13)}$ monovalent aromatic organic radical; $R^1$ is a monovalent radical selected from hydrogen, $C_{(1-8)}$ alkyl and mixtures thereof; $R^2$ is a $C_{(1-13)}$ monovalent organic radical; $R^3$ is a monovalent radical selected from $C_{(1-8)}$ alkyl, hydroxy, $C_{(1-8)}$ alkoxy, halo and nitro; $R^4$ is a $C_{(1-8)}$ alkyl radical; M is a metal or metalloid; Q is halogen; and d is equal to 4–6.

Examples of arylacyldialkyl sulfonium salts are:

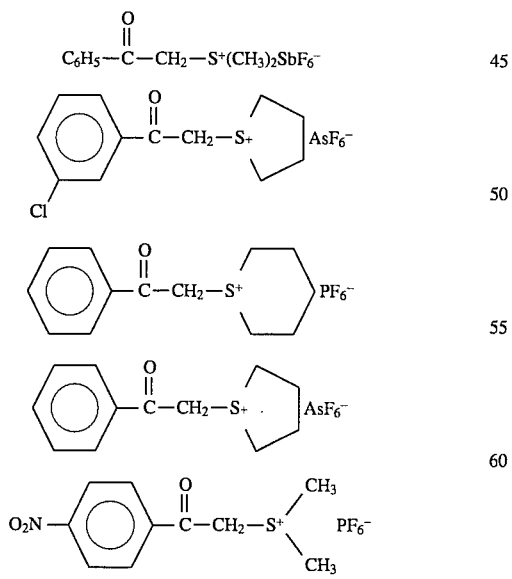

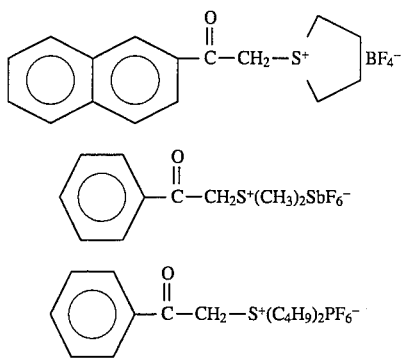

Examples of some hydroxyaryl dialkyl sulfonium salts are:

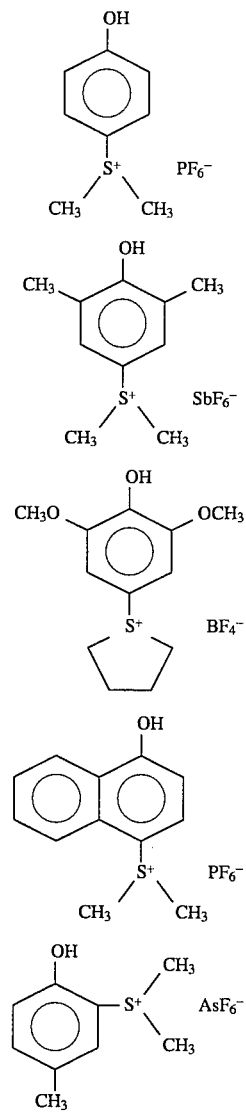

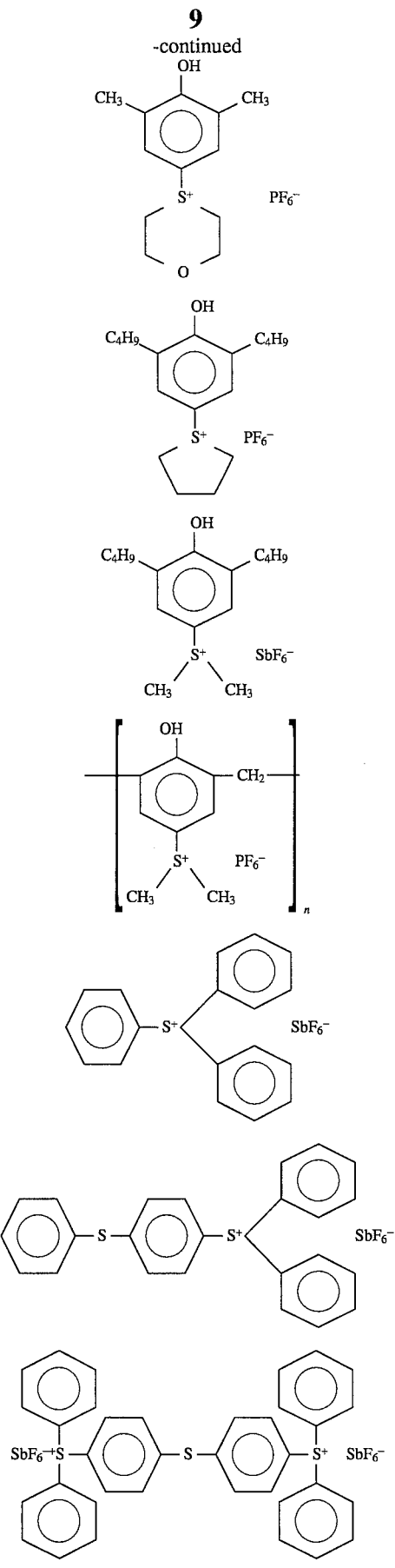

and

[structure: triphenylsulfonium triflate, S+CF₃SO₃⁻]

The black matrix polymer layer should be thick enough to provide an optical density of at least about 2. Usually, the thickness is about 0.7μ to about 1.5μ, typical of which being 1 μm.

The black matrix polymer layer can be applied by any known technique, typical of which being spin coating. In the case of a photosensitized composition, such is then exposed to radiation, such as ultraviolet, x-ray, ion-beams, and electron beams. The layer is then baked typically at temperatures of about 60° C. to about 150° C.

After exposure to actinic light and subsequent heating, the coating is developed by removing more soluble areas, depending on the photochemistry employed. Most commonly, the exposed region is less soluble than the non-exposed regions. Developing of the pattern can be accomplished by immersing or spraying the film with a suitable solvent. Some suitable solvents include NMP/diglyme mixtures, NMP/ethylacetate mixtures, diglyme, and NMP/xylene mixtures.

In addition, in the event the polymer is in the doped or conductive form the after exposure process, such is then converted back to the non-conductive or insulating state. For example, in the case of protonated (conducting) polyaniline, such is washed with a buffered base (sodium bicarbonate, potassium bicarbonate, ammonium hydroxide) to convert it into the non-conductive polyaniline. The protonareal polyaniline can also be heated to temperatures exceeding 200° C. to revert back to the non-conducting form.

Figure 4:
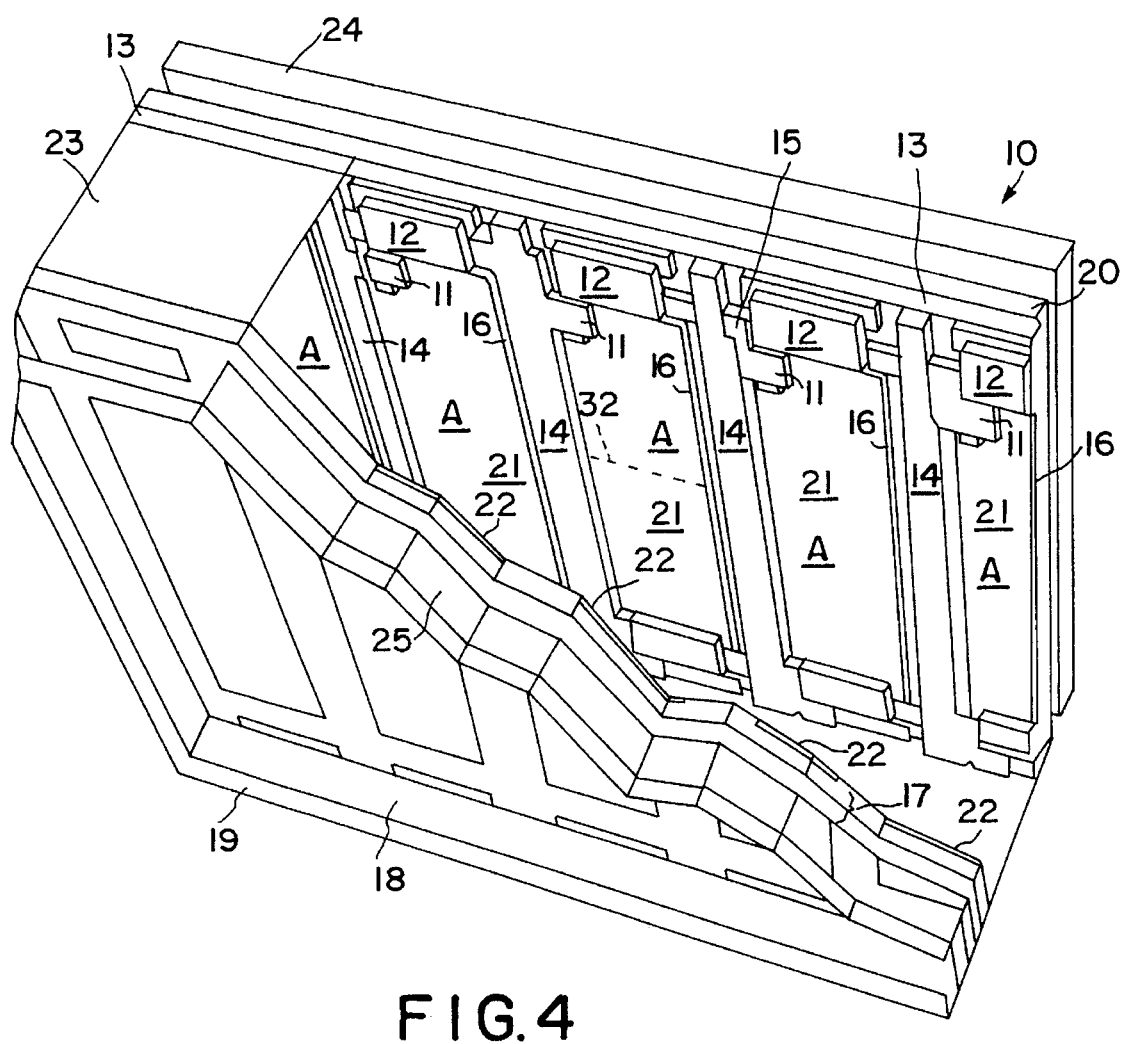
FIG. 4 is an enlarged partial perspective of a Thin Film Transistor Liquid Crystal Display.
Figure 5:
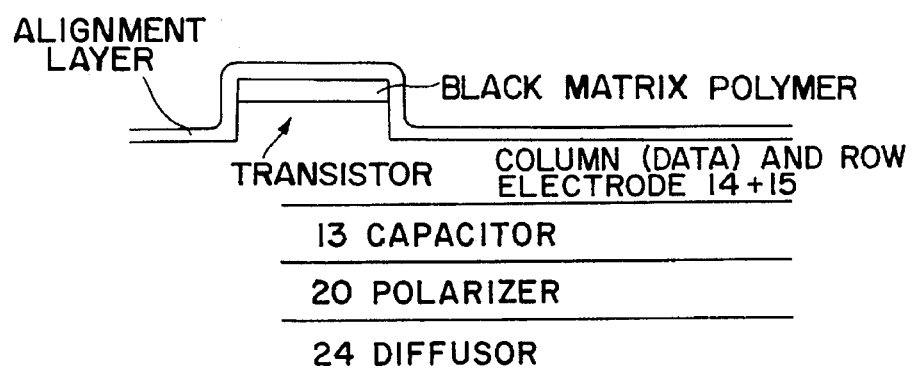
FIG. 5 is a schematic of a portion of a TFT LCD.

Reference to FIG. 4 illustrates a TFT LCD. In particular, as partially shown in FIG. 4, a conventional TFT display 10 comprises an array of cells or pixels A, each cell including a thin film transistor 12 to address the cell by applying a voltage to the cell when the transistor is in its own state and a capacitor 13, which maintains the voltage after the transistor is switched off. The transistor is formed on the back side of the display 10 and is connected between a column or data electrode 14 and a row electrode 15 and to a display transparent electrode 16 of each pixel, all at the back side of the display 10. The front side of the display 10 is formed with a continuous common transparent electrode 17 which is spaced apart from and positioned parallel to the transparent display electrodes. Both the common electrode 17 and the display electrodes 16 are typically formed of a thin transparent conductive material, such as indium tin oxide (ITO), carried on a glass substrate. Since the display electrode of each pixel is smaller in dimensions than the continuous common electrode, a fringe field results, which spreads outward from the pixel or cell edges to the common electrode when voltage is applied across the electrodes. Adjacent and parallel with the outside of the common electrode 17 and a glass substrate 18 is a polarizer 19. The black matrix layer 21 and alignment layer 22 are disposed on the inner surface of the display and common electrodes 16 and 17, respectively, and are in contact with a liquid crystal layer 23, for example, twisted nematic liquid crystal molecules with a positive dielectric constant, which is sealed between the two parallel mounted glass substrates carrying the alignment layers 21 and 22. On the back side of the display 10 is a visible light source (not shown), which irradiates the display 10 through a diffuser 24. If it is desired to have the display 10 in color, a color filter 25 is disposed adjacent the non-alignment layer side of the common electrode 17, and contains groups of the three primary colors (red, green and blue), each one of the primary colors being associated with one of a group of three adjacent pixels A to form a color cell.

Figure 2:
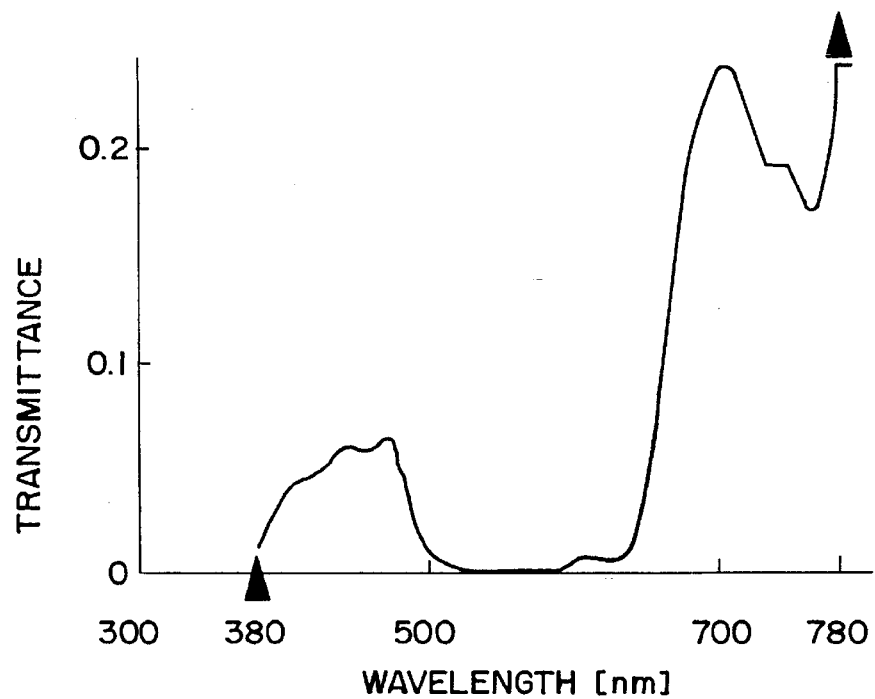
FIG. 2 is a transmission spectra of a 2 μm film of a prior an acrylate polymer black matrix.
Figure 1B:
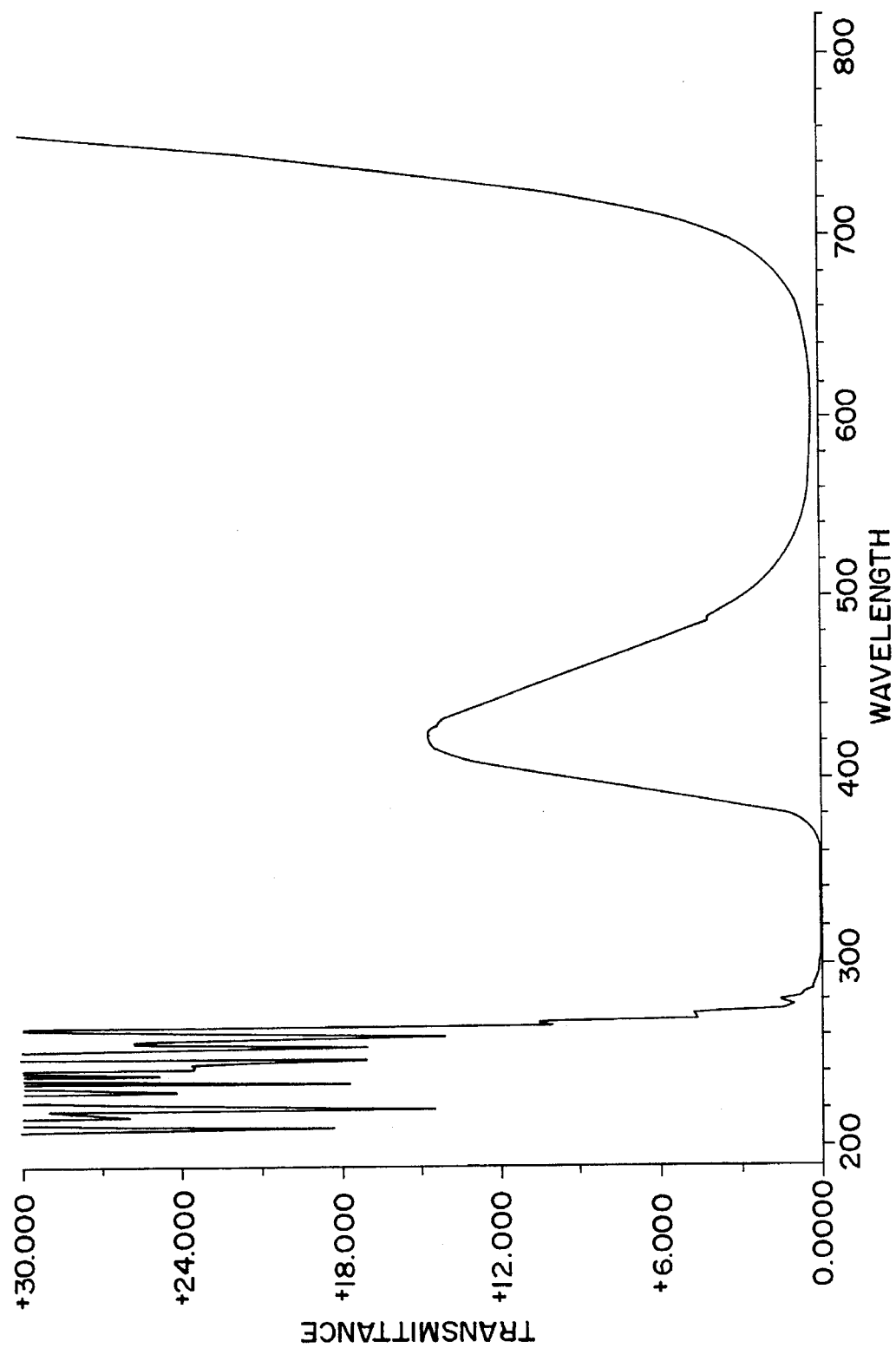

Suitability of the compositions of the present invention as the black matrix layer is illustrated by comparing the transmission spectra of FIG. 1 to FIG. 2. FIG. 1 is the transmission spectra of an ethoxy-polyaniline film measured at 1 μm thickness. FIG. 2 is the transmission spectra of the currently used pigment dispersed polymethylmethacrylate photopolymer composition measured at 2 μm thickness. As apparent, the transmittance behavior of both is very similar. The calculation of optical density of the untilled or unpigmented ethoxy polyaniline gives 1.44 at a film thickness of 1 μm.

Figure 3:
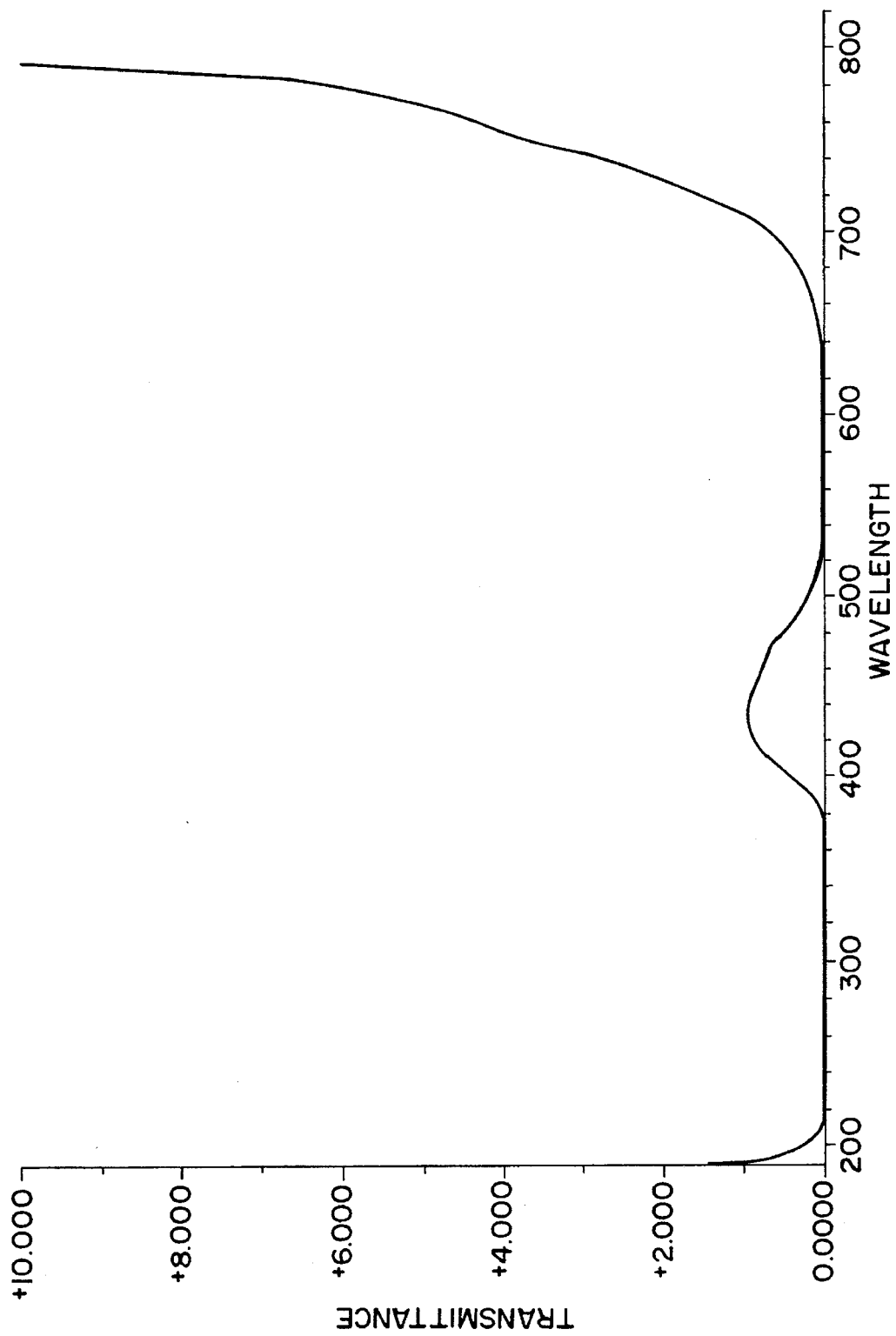
FIG. 3 is a transmission spectra for 1 μm films containing a polymer employed pursuant to the present invention.

FIG. 3 is the transmittance spectra for a pigmented ethoxy polyaniline containing 40% of a pigment mixture of yellow, violet, and blue pigments, available under the trade designations Paliotol Yellow, Hostaderm Violet and Heliogen Blue, respectively.

What is claimed is:

1. A thin film transistor display comprising a substrate,
   a diffuser layer located above said substrate;
   a polarizer layer located adjacent to said diffuser layer;
   a capacitor layer located adjacent to said polarizer layer;
   thin film transistors located directly adjacent said capacitor layer and containing data or column electrode and row electrode;
   a black matrix polymer layer adjacent said thin film transistors wherein said black matrix polymer layer that comprises at least one polymer having an optical density of at least about 0.8 per μm and being self-absorbent of visible light and being selected from the group consisting of substituted and unsubstituted polyparaphenylenevinylenes, substituted and unsubstituted polyanilines, substituted and unsubstituted polyazines, substituted and unsubstituted polythiophenes, substituted and unsubstituted polyparaphenylenes, substituted and unsubstituted poly-p-phenylene sulfides, substituted and unsubstituted polyfuranes, substituted and unsubstituted polypyrroles, substituted and unsubstituted polyselenophene, substituted and unsubstituted polyacetylenes and copolymers thereof; and a pigment; and mixtures thereof.
   and an alignment layer adjacent said black matrix layer.

2. The display of claim 1 wherein said polymer is a polyaniline.

3. The display of claim 2 wherein said polyaniline is an alkoxy substituted polyaniline.

4. The display of claim 1 wherein said pigment is fluorinated carbon black.

5. The display of claim 1 wherein the relative amount of said polymer is about 30% to about 80%, and that of said pigment is about 20% to about 70%, based upon the total of said polymer and said pigment in the composition.

6. The display of claim 1 being a liquid crystal display.

7. The display of claim 1 wherein said black matrix polymer layer has an optical density of at least about 2.

8. The display of claim 7 wherein the thickness of said black matrix polymer layer is about 1 μm.

9. The display of claim 1 wherein said black matrix polymer layer further contains a photoinitiator.

10. A thin film transistor display wherein the improvement comprises a black matrix polymer layer, that comprises a polymer having an optical density of at least about 0.8 per μm and being self-absorbent of visible light and being selected from the group consisting of substituted and unsubstituted polyanilines, substituted and unsubstituted polyparaphenylenevinylenes, substituted and unsubstituted polythiophenes, substituted and unsubstituted polyazines, substituted and unsubstituted polyparaphenylenes, substituted and unsubstituted polyfuranes, substituted and unsubstituted polypyrroles, substituted and unsubstituted polyselenophene, substituted and unsubstituted poly-p-phenylene sulfides and substituted and unsubstituted polyacetylenes, and mixtures thereof, and copolymers thereof; and a pigment.

* * * * *